Patented Oct. 28, 1924.

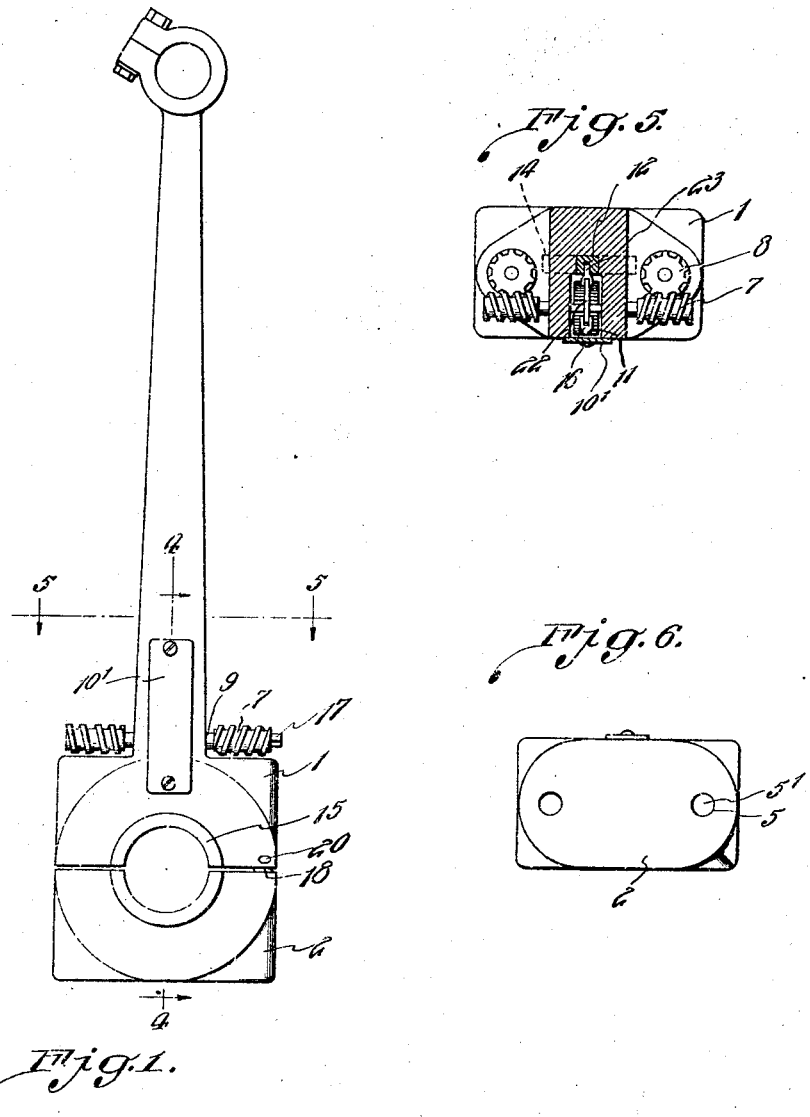

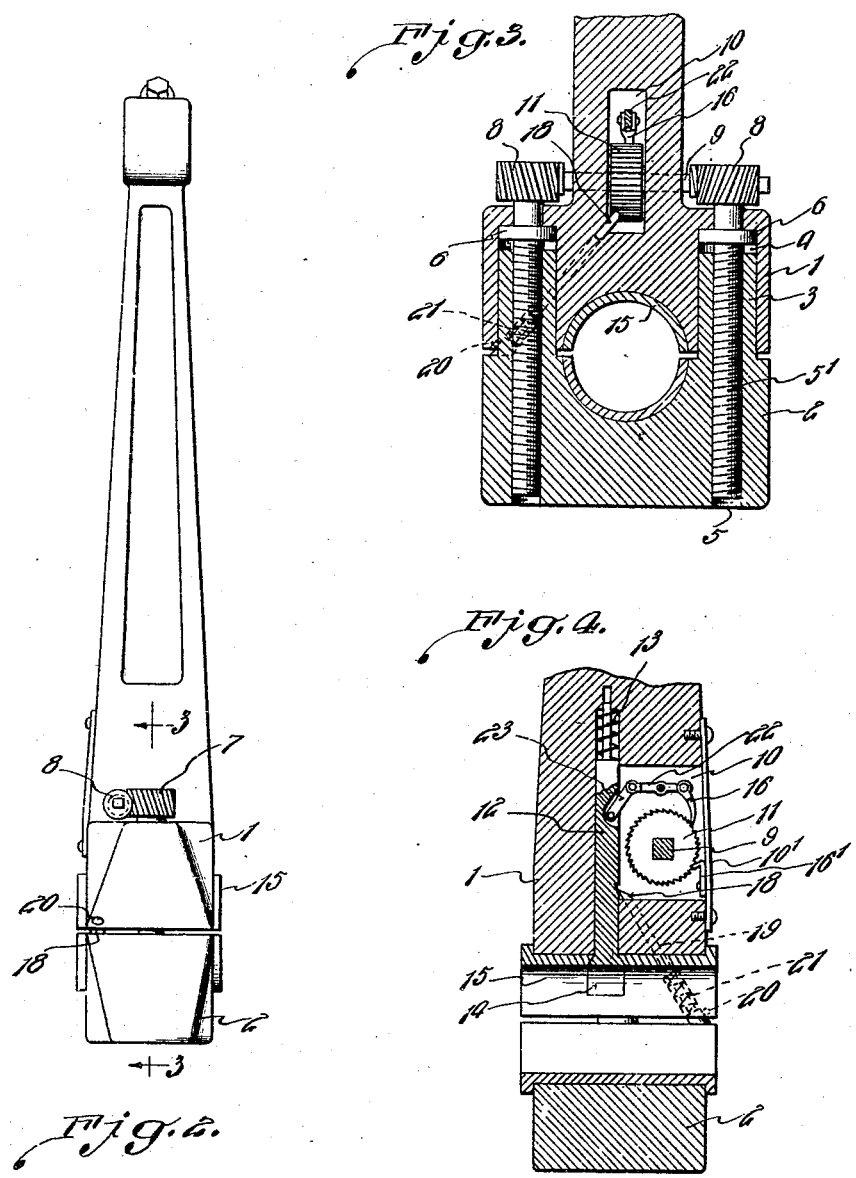

1,513,169

UNITED STATES PATENT OFFICE.

JAMES A. HAM, OF GRANDFIELD, OKLAHOMA.

BEARING.

Application filed March 12, 1923. Serial No. 624,491.

*To all whom it may concern:*

Be it known that I, JAMES A. HAM, a citizen of the United States, residing at Grandfield, in the county of Tillman and State of Oklahoma, have invented new and useful Improvements in Bearings, of which the following is a specification.

The general object of this invention is to provide means for automatically tightening bearings by the vibrations of a part of the bearing.

Another object of the invention is to provide means for rendering the automatic means inactive when the bearings are to be adjusted by hand.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation showing the invention applied to a connecting rod bearing.

Figure 2 is an edge view thereof.

Figure 3 is a section on line 3—3 of Figure 2.

Figure 4 is a section on line 4—4 of Figure 1.

Figure 5 is a section on line 5—5 of Figure 1.

Figure 6 is a bottom plan view.

In these views 1 indicates the upper section of a connecting rod bearing and 2 the lower section thereof. The lower section is provided with the tubular projections 3 which are arranged to fit in sockets 4 in the upper section. The lower section is provided with threaded holes 5 which pass entirely through the same and through the projections 3. The threads are oppositely arranged and they are engaged by the threaded portions of the shafts 5, one shaft having left hand screw threads and the other right hand screw threads. These shafts pass through the upper section and are provided with collars 6 which engage the inner ends of the sockets 4 of the upper section. A worm gear 7 is connected with the projecting end of each shaft and these gears are engaged by the worms 8 on the ends of a cross shaft 9 which passes through the connecting rod. The upper section and the base of the connecting rod is chambered, as shown at 10, the cross shaft passing through this chamber. A ratchet wheel 11 is carried by the shaft within the chamber and a plunger 12 passes vertically through the chamber and is pressed downwardly by a spring 13 located in the upper part of the chamber and engaging the reduced upper end of the plunger. The lower end of the plunger is enlarged, as at 14, and this enlargement engages a countersunk hole in the upper semi-circular bearing 15 and the lower end of the plunger is curved to conform to the concave face of said bearing. The plunger is hingedly connected to a pivoted lever 22 by a link 23 which is pivotally connected with the plunger and with the lever and a dog 16 is carried by the free end of the lever and engages the ratchet wheel 11. The plunger is made square near its enlarged end to prevent its turning and the cover 10′ for the chamber carries a dog 16′ engaging the ratchet wheel 11 to prevent retrograde movement of the same.

From the foregoing it will be seen that if the bearing becomes loose the movement of the shaft will cause the plunger to reciprocate and this movement of the plunger will be communicated to the ratchet wheel 11 by the dog 16 and the lever 22 so that the shank 9 will be rotated and the rotation of this shaft will be communicated to the shafts 4 by the worm gearing and thus the section 2 will be moved towards the section 1 by the threaded connection between the shafts 4 and said lower section. Thus the bearing is automatically kept tight. In order to permit the bearing to be adjusted by hand one end of the shaft 9 is made so that it can receive a socket wrench, as shown at 17.

When the parts are to be assembled the cover 10 is removed and the dog 16 swung out of engagement with the ratchet wheel 11 and then a wrench is placed on the square end 17 of the shaft 9 and said shaft rotated to tighten the bearing upon the shaft. A space must be left between the sections 1 and 2 which will be equal to the amount of wear allowed in the bearing. The dog 16 is then placed in engagement with the ratchet wheel and the cover put back in place.

In order to prevent movement of the plunger 12 after the bearing is tight I provide a rod 18 which passes through a hole 19 formed in the upper section and which communicates with the chamber and has its upper end engaging a notch in the plunger. The lower end of the rod will be engaged by the lower section when the bearing is tight and thus the plunger will be held in raised position and against movement. When the sections come together further adjustment cannot be made and new bearing parts must be substituted for the worn ones as soon as a knock occurs or as soon as it becomes apparent that the bearing parts are worn. When the lower section is separated from the upper section a spring 21 will force the rod 18 downwardly and thus release the plunger 12 so that the parts will be again in position to take up wear on the new bearing parts. A pin 20 holds the rod and the spring in position.

It will of course be understood that the device can be attached to other bearings for automatically taking up play therein.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a bearing, a screw shaft carried by one section of the bearing and engaging a screw threaded hole in the other section, a cross shaft, gears connecting the two shafts together, a plunger adapted to be reciprocated by the shaft when the bearing becomes loose, means for imparting a rotary movement to the second shaft by the reciprocating movement of the plunger, such means consisting of ratchet mechanism for connecting the shaft to the plunger and means for rendering the ratchet mechanism inactive when the first shaft is to be turned by hand and when the bearing is tight.

2. In combination with a bearing, a pair of screw shafts carried by one section and the other section having screw threaded holes for receiving the screw threaded parts of the shafts, a cross shaft carried by the first section, gearing connecting the cross shaft with the other shafts, a plunger carried by the first shaft and adapted to be reciprocated by the shafting when the bearing becomes loose, ratchet mechanism connecting the plunger with the cross shaft and means for holding the plunger in raised position with its dog free from the ratchet wheel on the cross shaft when desired and when the bearing is tight.

In testimony whereof I affix my signature.

JAMES A. HAM.